United States Patent [19]
Taylor et al.

[11] Patent Number: 5,398,496
[45] Date of Patent: Mar. 21, 1995

[54] GAS TURBINE ENGINES

[75] Inventors: David H. Taylor, Warwickshire; Arthur B. Griffin, Leicestershire; David W. Tuson, Derby, all of England

[73] Assignee: Rolls-Royce, plc, London, England

[21] Appl. No.: 207,614

[22] Filed: Mar. 9, 1994

[30] Foreign Application Priority Data

Mar. 11, 1993 [GB] United Kingdom ............. 9304994

[51] Int. Cl.⁶ .................................. F02C 7/00
[52] U.S. Cl. ........................ 60/39.31; 60/752
[58] Field of Search ............. 60/39.31, 39.32, 39.83, 60/39.75, 752, 757

[56] References Cited

U.S. PATENT DOCUMENTS

| | | | |
|---|---|---|---|
| H903 | 4/1991 | Weinstein | 60/757 |
| 3,186,168 | 6/1965 | Ormerod et al. | 60/39.32 |
| 3,959,966 | 6/1976 | Pearce et al. | 60/39.32 |
| 3,965,066 | 6/1976 | Sterman et al. | 60/39.32 |
| 4,739,621 | 4/1988 | Pettengill et al. | 60/39.83 |
| 4,798,514 | 1/1989 | Pask | |
| 4,821,522 | 4/1989 | Matthews et al. | 60/39.83 |

FOREIGN PATENT DOCUMENTS 1219665 1/1971 United Kingdom .
2102897 2/1983 United Kingdom .

Primary Examiner—Timothy S. Thorpe
Attorney, Agent, or Firm—Cushman, Darby & Cushman

[57] ABSTRACT

A gas turbine engine component support assembly (30) comprises a pair of ring members (64) and (74) defining a slot in which a cranked flange (28) extending from the inner surfaces of an array of combustion chamber discharge nozzles (22) is located. One part (28B) of the cranked flange has projections (28C) which engage with radial slots (76) formed in one of the ring members (74) to provide cross-key location of the discharge nozzles. The support assembly (30) is located adjacent the radially inner platform of an array of nozzle guide vanes (20), and also provides support and location for the vanes.

8 Claims, 1 Drawing Sheet

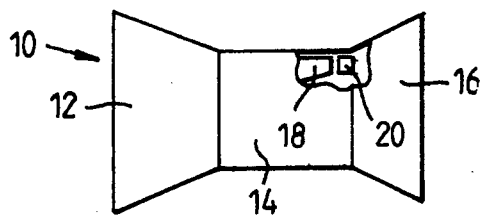
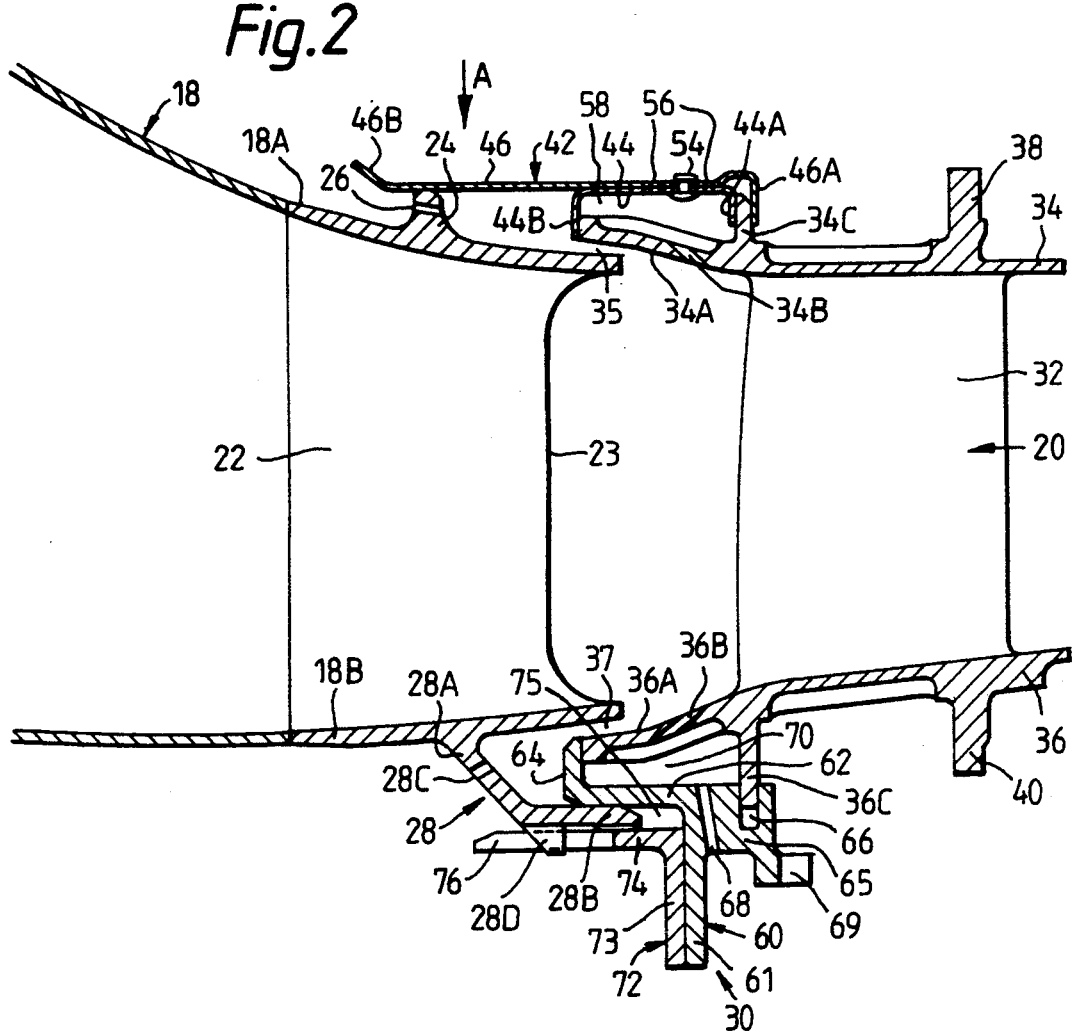
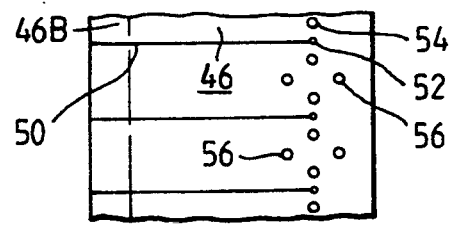

GAS TURBINE ENGINES

FIELD OF THE INVENTION

The present invention relates to axial flow gas turbine engines, in particular to static structures for locating and supporting combustion chamber discharge nozzles and the nozzle guide vanes downstream of such discharge nozzles.

BACKGROUND OF THE INVENTION

A conventional present day axial flow gas turbine engine normally comprises, in axial flow sequence, a compressor section, a combustor (which may be radially disposed), in which compressed air from the high pressure compressor is mixed with fuel and burnt, and a turbine section driven by the products of combustion. In the case of an aeroengine (excluding turboshaft aeroengines), all the power developed by the turbine section is used to drive the compressor section, which can include a fan propulsor. In the case of a turboshaft engine, or an engine adapted for electrical power generation or marine propulsion, the turbine section has an upstream part which is used to drive the compressor section, and a downstream part comprising a power turbine on a power offtake shaft which rotates independently of the rest of the turbine section.

Note that in the present specification, the terms "upstream" and "downstream" refer to the direction of compressed air and combustion gas flows through the axial flow compressors and turbines of axial flow gas turbine engines. Hence, for a component associated with a main gas passage of such a turbine or compressor, the upstream direction is towards the front of the engine and the downstream direction is towards its rear.

The products of combustion pass from the combustor through discharge nozzles to the first stage of the turbine through an array of nozzle guide vanes. These nozzle guide vanes must be supported and located both axially and radially to cope with the dynamic and thermal loads occurring during engine operation.

The downstream end of the combustor must also be located and supported in such a way that it can cope with the dynamic and thermal loads which occur during engine operation. Furthermore, the support and location of the nozzle guide vanes and the downstream portion of the combustor should be such that loads applied to nozzle guide vanes do not impose loads upon the downstream portion of the combustor and vice versa.

SUMMARY OF THE INVENTION

An object of the present invention is to provide improved means for supporting and locating the downstream portion of the combustor relative to the nozzle guide vane array.

Accordingly, the present invention provides an axial flow gas turbine engine including combustion chamber discharge nozzle means and an array of nozzle guide vanes located downstream of the discharge nozzle means, the nozzle guide vanes having inner platforms with upstream portions extending towards the downstream end of the discharge nozzle means, the discharge nozzle means being cross-key located and supported by a support assembly positioned adjacent the upstream portions of the inner platforms of the nozzle guide vanes, the support assembly comprising ring means defining an axially extending annular slot, the discharge nozzle means having flange means located in the annular slot, the flange means having angularly spaced radial projections located in complementary apertures provided in the ring means.

Preferably, the support assembly, in combination with the inner platforms, defines an annular chamber adjacent the upstream portions of the inner platforms, the support assembly having cooling air metering holes therein for the flow of cooling air into the annular chamber and the upstream portions of the inner platforms having cooling holes therein for flow of cooling air out of the annular chamber onto outer surfaces of the inner platforms, thereby to film cool the outer surfaces.

The support assembly may comprise outer and inner ring members having respective co-extending portions which are secured in contact with each other along contact faces.

The outer ring member may comprise a forwardly extending flange having an outwardly turned flange portion which cooperates with the nozzle guide vanes' inner platforms to help define the annular chamber for the supply of cooling air to the cooling air holes in the inner platform extension. The outer ring member preferably also comprises means for receiving location features provided on the nozzle guide vanes' inner platforms.

The inner ring member may comprise a forwardly extending flange, which in conjunction with the forwardly extending flange of the outer ring member defines the axially extending annular slot for location of the flange means of the discharge nozzle means. To complete cross-key location of the discharge nozzle means, the forwardly extending flange of the inner ring member can be formed with a plurality of angularly spaced slots for cooperation with the radial projections on the flange means.

BRIEF DESCRIPTION OF THE DRAWINGS

The present invention will now be more particularly described with reference to the accompanying drawings in which:

FIG. 1 shows diagrammatically an axial flow gas turbine engine;

FIG. 2 shows a portion of a gas turbine engine to a larger scale, incorporating an embodiment of the present invention; and FIG. 3 shows a partially developed view on arrow A in FIG. 2.

DETAILED DESCRIPTION OF THE INVENTION

Referring to FIG. 1, a gas turbine engine 10 comprises a compressor 12, a combustor 14 and a turbine 16. The combustor 14 is of the can-annular type; that is, there are a number of combustion chambers each having separate but circumferentially closely adjacent or contiguous discharge nozzles, the combustion chambers being located in an annular casing. In FIG. 1 the annular casing is not shown but each combustion chamber is indicated at 18 and an array of nozzle guide vanes 20 is located between the downstream end of the combustion chambers 18 and the first stage of the turbine 16.

Although the combustion chamber 18 is shown as axially disposed, some industrial and power generating engines have combustion chambers which are radially disposed, at least at their upstream ends, and the embodiment of FIG. 2 is particularly applicable to these.

Referring more particularly to FIG. 2, this shows the axially disposed downstream portion 18A of a combustion chamber 18 and the nozzle guide vanes 20 in more detail. Each combustion chamber 18 has a discharge nozzle 22 and the combination of the discharge nozzles 22 define a generally annular outlet divided by radially extending side walls 23 of each discharge nozzle 22. Each discharge nozzle has on its radially outer surface a circumferentially and radially extending flange 24, termed a "rail". Flanges or rails 24 on the individual discharge nozzles 22 together form a circumferential ring. Each rail 24 is provided with a plurality of circumferentially spaced apart cooling air holes 26.

The radially inner wall 18B of each discharge nozzle 22 is provided with a circumferentially and inwardly extending cranked flange 28 having an outer part 28A inclined to the axial and radial directions and an axially extending inner part 28B. Flanges 28 of adjacent discharge nozzles abut each other so that the outer parts 28A of the flanges 28 collectively form a frustum and the inner parts 28B collectively form a cylinder. Part 28A is provided with a plurality of circumferentially spaced apart cooling air holes 28C and part 28B is provided with a row of circumferentially spaced apart radially inwardly extending projections or teeth 28D. The flange part 28B and the projections 28D engage with a support structure 30, which will be described in more detail below.

Each nozzle guide vane 20 comprises an aerofoil portion 32, which is cast integrally with an outer platform 34 and an inner platform 36. Platforms 34 and 36 are provided with dogs 38 and 40 respectively, which are held in a conventional manner in static structure (not shown) of the engine, in order to locate the vanes and to support them against loads imposed during engine operation.

The outer and inner platforms have forwardly projecting extensions 34A and 36A, respectively, which extend towards the outer and inner walls 18A,18B, respectively, of the discharge nozzles 22. The upstream ends of the platform extensions 34A,36A overlap and embrace the downstream ends of the discharge nozzles' outer and inner walls such that respective gaps 35,37 remain for a flow of film cooling air onto the platforms past their upstream edges. Both of the extensions 34A and 36A are additionally provided with holes 34B and 36B respectively for renewing and adding to the flow of film cooling air over the platforms.

A sheet metal seal assembly 42 is arranged to provide a seal between the outer platforms 34 of the nozzle guide vanes 20 and the adjacent parts of the discharge nozzles 22 of the combustion chambers 18. This seal assembly 42 comprises inner and outer ring members 44 and 46, which extend axially in contact with each other and are secured together by circumferentially spaced rivets 54. Inner ring 44 has two inwardly directed flanges 44A and 44B at its axially opposed ends, whereas outer ring 46 is provided with an inwardly directed flange 46A at its rear end and an outwardly turned flexible lip 46B at its front end.

The flanges 44A and 46A of the rings 44 and 46 are axially spaced by an amount sufficient to allow the seal assembly to clip over a short radially projecting flange or rail 34C on the outer platform 34 of each nozzle guide vane 20. Flanges 44A and 46A are sufficiently engaged with the rails 34C that the forward end of the outer ring 46 resiliently engages the rails 24 on the discharge nozzles 22 and the flange 44B of inner ring 44 slides over the upstream end of the extended platform portion 34A. The angled lip 46B provides a lead in to aid insertion of the discharge nozzles 22 during assembly of the engine.

As the means of support 30 for the discharge nozzles 22 is at an inner location, the seal assembly 42 only needs to provide a seal and a controlled cooling air flow. In order to avoid opposing thermal loading across the radial height of the discharge nozzle between the inner support and the outer seal assembly, the outer seal assembly 42 is as flexible as possible.

Referring particularly to FIG. 3, the outer ring 46 is provided with a plurality of spaced apart very narrow slots 50 which terminate in small holes 52 drilled only through ring 46. Slots 50 render the upstream or forward end of ring 46 sufficiently flexible to allow assembly of the engine and to allow for relative radial movement between the discharge nozzles 22 and the nozzle guide vanes 20 during engine operation. In the present instance, holes 52 and slots 50 are shown as provided between every alternate pair of rivets 54 to obtain the desired flexibility in a high grade proprietary sheet alloy, such as Haynes 25 (Trade Mark), with a thickness of about 1 mm. Inner sheet metal ring 44 can conveniently be made of the same material. The small holes 52 are stress relieving features to prevent overstressing of the sheet material at the rear ends of the slots as it flexes during assembly and operation of the engine.

Cooling air inlet holes 56, drilled through both rings 44 and 46, are provided to allow air to enter the outer annular space 58 created between the seal assembly 42 and the outer platform extension 34A of the nozzle guide vanes 20. Air entering through holes 56 feeds the outflow of air through the circumferential row of cooling holes 34B in platform extensions 34A. Holes 34B are angled rearwardly and are sufficiently closely spaced to enable the air flowing out of them to spread out and perform a film cooling function, as known per se, on the inner surface of the nozzle guide vane platform 34.

Also, cooling air can enter through the drillings 26 in the rails 24. This supplements the air flow through the slots 50 and leakage flow between ring 46 and rail 24 to cool the outsides of the discharge nozzles 22 and ensure a flow of film cooling air through the gap 35 between the outsides of the discharge nozzles and the inner surfaces of the upstream ends of the nozzle guide vane outer platform extensions 34A.

It will be appreciated that the seal assembly 42 acts only as a seal between the discharge nozzle 22 and the nozzle guide vanes 20 and does not provide any mechanical support for these components. It also helps to meter cooling air supplies to the outer surfaces of the discharge nozzles 22 and the outer platforms 34 of the nozzle guide vanes 20.

The discharge nozzle and nozzle guide vane support assembly 30 comprises outer and inner ring members 60 and 72 which both have radially inner radially coextending portions 61,73 which are secured together in contact with each other along plane contact faces by circumferentially spaced bolts (not shown), The outer part of ring member 60 comprises a forwardly extending flange 62 having a radially outwardly turned flange or lip 64, the rear face of which engages, or is closely adjacent to, the forward edge of the vane's inner platform extension 36A. This defines a chamber 70 for the supply of cooling air to the row of rearwardly inclined holes 36B in the inner platform extension 36A, which fulfil a similar purpose to the holes 34B in the outer platform. The outer part of ring member 60 also comprises a rearwardly extending portion 65 having a circumferentially extending slot 66 in which front lugs or flanges 6C of the nozzle guide vane inner platforms 36 are located. Holes 68 are drilled through the radially outer part of ring member 60 so that the chamber 70 is supplied with cooling air. The other feature of ring member 60 is the circumferentially spaced array of teeth 69 provided at the rear of portion 65. These teeth 69 are provided, as known, to engage with neighbouring static structure (not shown) to provide cross-key location for the front of the nozzle guide vanes 20.

The inner ring member 72 has a forwardly extending flange 74, which in conjunction with the forwardly extending flange 62 of ring member 60 defines an annular slot or mouth 75 sized to receive the rearwardly extending inner part 28B of the cranked flange 28 supporting the discharge nozzle 22. To complete cross-key location of the discharge nozzles, flange 74 is formed with a plurality of circumferentially equi-spaced slots 76 in which are received corresponding teeth 28D projecting inwardly from the flange part 28B.

Assembly 30 is a simple two component arrangement which provides a controlled circumferential mouth 75 for supporting and locating the downstream end of the discharge nozzles and provides adequate sealing and control of cooling flows to the inner platforms of the nozzle guide vanes. This means of supporting the downstream ends of the combustion chambers 18 allows relative axial movement between the discharge nozzles 22 and the nozzle guide vanes 20, whilst reacting other dynamic and thermal loading occurring during engine operation. Also, in the event of engine surge, when the direction of forces generated by the air passing through the discharge nozzles is reversed, the arrangement will provide them with the necessary positive location.

The overall combination of the inner seal and support assembly 30 and the outer seal assembly 42 further provides a minimum of opposing thermal loads across the radial height of the discharge nozzle side walls 23 between the inner and outer supporting and sealing arrangements.

It should be noted that the part 28A of the flange 28 is provided with cooling air inlet openings 28C, supplemented by leakage flow through the slots 76 past the part 28B, so cooling the undersides of the discharge nozzles 22 and ensuring a flow of cooling air through the gap between the underside of the discharge nozzles and the upstream ends of the outer surfaces of the nozzle guide vane inner platform extensions 36A.

A matter of interest concerning the nozzle guide vane platform extensions, 34A,36A is connected with reducing aerodynamic losses. The extension of the platforms to embrace and overlap the outlet from the discharge nozzles 22 reduces or eliminates the bow wave effect which would otherwise arise if the outlet from the discharge nozzles 22 was aligned with the inlet to the nozzle guide vanes 20 defined by the outer platform 34. The presence of a bow wave causes hot streaks on the platforms of the nozzle guide vanes due to impingement of the hot combustion gases on the surface. This is detrimental to component performance and life.

It will be appreciated from the above that, in cooperation with the flanges 28 and 24 on the discharge nozzles 22, the seal assemblies 30 and 42 are intended to provide adequate sealing at the interface between the discharge nozzles and the nozzle guide vanes and control cooling air flows to the nozzle guide vane outer platforms, while producing an even distribution of cooling air flow into the main flow.

One of the advantages of seal assembly 42 is that no significant additional loads are imposed on the nozzle guide vanes because it allows relative thermal expansion between the inner support assembly 30, the discharge nozzles 22 and the outer seal assembly itself without creating opposing thermal loads across these three components. Such additional loads could interfere with the freedom of the individual nozzle guide vanes to tilt along the lengths of their existing chordal seals (such as flanges 36C, 38 and 40 in FIG.2) in response to differential loads.

We claim:

1. An axial flow gas turbine engine including a plurality of combustion chamber discharge nozzle means and an array of nozzle guide vanes each located downstream of a said discharge nozzle means, each said nozzle means having a downstream end, each said nozzle guide vane having an inner platform with an upstream portion extending towards the downstream end of said discharge nozzle means, the discharge nozzle means being cross-key located and supported by a support assembly positioned adjacent said upstream portion of the inner platform of said nozzle guide vane, said support assembly comprising a ring member defining an axially extending annular slot, each discharge nozzle means having flange means located in the annular slot, each flange means having angularly spaced radial projections located in complementary apertures provided in the said ring member.

2. An axial flow gas turbine engine according to claim 1, wherein the support assembly, in combination with the inner platforms, defines an annular chamber adjacent the upstream portions of the inner platforms, the support assembly having cooling air metering holes therein for the flow of cooling air into the annular chamber and the upstream portions of the inner platforms having cooling holes therein for flow of cooling air out of the annular chamber onto outer surfaces of the inner platforms, thereby to film cool the outer surfaces.

3. An axial flow gas turbine engine according to claim 1 or claim 2, wherein the support assembly comprises outer and inner rings having respective co-extending portions which are secured in contact with each other along contact faces.

4. An axial flow gas turbine engine according to claim 2 in which the outer ring comprises a forwardly extending flange having an outwardly turned flange portion which cooperates with the nozzle guide vanes' inner platforms to help define the annular chamber for the supply of cooling air to the cooling air holes in the inner platform extension.

5. An axial flow gas turbine engine according to claim 3 or claim 4 in which the outer ring includes means for receiving location features provided on the nozzle guide vanes' inner platforms.

6. An axial flow gas turbine engine according to claim 4, in which the inner ring comprises a forwardly extending flange, which in conjunction with the forwardly extending flange of the outer ring member defines the axially extending annular slot for location of the flange means of the discharge nozzle means.

7. An axial flow gas turbine engine according to claim 6, in which the forwardly extending flange of the inner ring is formed with a plurality of angularly spaced slots for cooperation with the radial projections on the flange means.

8. An axial flow gas turbine engine including combustion chamber discharge nozzle means and an array of nozzle guide vanes located downstream of said discharge nozzle means, the nozzle guide vanes having inner platforms with upstream portions extending towards the downstream end of the discharge nozzle means, the discharge nozzle means being cross-key located and supported by a support assembly positioned adjacent the upstream portions of the inner platforms of the nozzle guide vanes, the support assembly comprising a ring member defining an axially extending annular slot, the discharge nozzle means having flange means located in the annular slot, the flange means having angularly spaced radial projections located in complementary apertures provided in said ring member.

* * * * *